United States Patent
Liedmeyer et al.

(10) Patent No.: US 7,517,000 B2
(45) Date of Patent: Apr. 14, 2009

(54) CABRIOLET CAR

(75) Inventors: Petra Liedmeyer, Recke (DE); Sven Hollenbeck, Westerkappeln (DE)

(73) Assignee: Wilhelm Karmann GmbH, Osnabrück (DE)

( * ) Notice: Subject to any disclaimer, the term of this patent is extended or adjusted under 35 U.S.C. 154(b) by 0 days.

(21) Appl. No.: 10/577,079

(22) PCT Filed: Oct. 22, 2004

(86) PCT No.: PCT/DE2004/002361

§ 371 (c)(1), (2), (4) Date: Jan. 16, 2007

(87) PCT Pub. No.: WO2005/039911

PCT Pub. Date: May 6, 2005

(65) Prior Publication Data

US 2007/0194597 A1 Aug. 23, 2007

(30) Foreign Application Priority Data

Oct. 24, 2003 (DE) .............................. 103 49 820

(51) Int. Cl.
*B60J 7/12* (2006.01)
(52) U.S. Cl. .................... 296/107.09; 296/117; 296/124
(58) Field of Classification Search ............ 296/107.08, 296/107.09, 116, 117, 124, 125, 132
See application file for complete search history.

(56) References Cited

U.S. PATENT DOCUMENTS

| | | | | |
|---|---|---|---|---|
| 367,064 | A * | 7/1887 | Reuck | 296/125 |
| 3,994,524 | A * | 11/1976 | Lehmann | 296/122 |
| 5,225,747 | A * | 7/1993 | Helms et al. | 318/265 |
| 5,645,309 | A * | 7/1997 | Graf | 296/121 |
| 5,829,821 | A * | 11/1998 | Aydt et al. | 296/122 |
| 6,039,382 | A * | 3/2000 | Mather et al. | 296/107.01 |
| 6,149,221 | A * | 11/2000 | Mentink | 296/117 |
| 6,347,827 | B1 * | 2/2002 | Maass | 296/107.09 |
| 6,629,719 | B2 * | 10/2003 | Sims | 296/109 |
| 6,695,385 | B1 * | 2/2004 | Lange | 296/107.12 |
| 7,445,266 | B2 * | 11/2008 | Liedmeyer et al. | 296/124 |

FOREIGN PATENT DOCUMENTS

| | | |
|---|---|---|
| DE | 196 10 969 | 9/1997 |
| DE | 101 57 819 | 6/2003 |
| EP | 1 024 042 | 8/2000 |

* cited by examiner

*Primary Examiner*—Glenn Dayoan
*Assistant Examiner*—Paul A Chenevert
(74) *Attorney, Agent, or Firm*—Friedrich Kueffner

(57) ABSTRACT

The invention relates to a cabriolet car (1) comprising a roof provided with a flexible cover (3) at least in the rear part thereof, wherein the cover (3) being in a closed position can be tensionally supported with respect to a body (7) with the aid of a tension bow (11). In order to open the roof (2), the tension bow (11) is displaced to the closed position thereof, wherein said bow is arranged on a closed support element (A) of the body (7), first upward (AS) and, when the support element is open, backward (RS) and subsequently to the open position, wherein said tension bow is arranged under the plan of the closed support element (A) being displaced downwards (AV). Said invention provides for a first displacement center (25) for displacing the tension bow (11) upwards and backwards (AS, RS) and a separate second displacement center for displacing said tension bow downward (AV). When the tension bow is displaced downwards rotating around the second displacement center, the displacement thereof around the first displacement center (25) is inhibited.

13 Claims, 9 Drawing Sheets

CABRIOLET CAR

The invention concerns a convertible vehicle with at least one tension bow in accordance with the introductory clause of claim 1 and an associated vehicle roof.

Many vehicles are known that have a flexible roof covering supported on a metal roof frame and fastened at the rear to a tension bow. When the roof is closed, the tension bow lies on a supporting structure of the automobile body, e.g., a movable cover part of a folding-top compartment, and tensions the roof covering, which can be held in its front section on a rigid roof tip. To open the roof, the tension bow can first be moved upward in a first phase of movement, so that said supporting structure can open. It can then be moved downward into its original closed position—of course, now no longer supported by the supporting structure—and therefore can be further displaced beyond that point into a closed position. During this displacement, the tension bow has to pass through only a small downward pivoting angle, while, for example, the front tip portion of the roof, which also rotates about the main bearing, is rotated, e.g., 180° overhead. During this operation, the tension bow is often held only by the tension in the roof covering and otherwise could pivot downward, unbraked, into the folding-top compartment, where it can then strike quite hard against a support in the folding-top compartment in an early phase of the pivoting of the roof about the main bearing. In the contact position with this support, the tension bow then slides and rubs over the folding-top compartment as the other parts of the roof continue to rotate into their stowed position in the folding-top compartment, so that both the support and the tension bow itself are subject to increased wear, e.g., in the form of paint removal or abrasion of a lining. During the closing of the roof, the tension bow is pulled over the support in the opposite direction, which doubles the wear in a roof opening and closing cycle.

DE 101 57 819 A1 discloses a tension bow with two centers of motion, such that in a first phase of movement of the roof opening, the tension bow can rotate only about the first center of motion. In the following phase, the tension bow can then move simultaneously about the first and the second centers of motion. Two hydraulic cylinders are needed for the movements about the two centers of motion, and the first cylinder must continue to be acted upon with hydraulic oil in an extended position during the movement about the second center of motion to enable it to act as a rigid link. The installation and space requirement due to the two driving mechanisms is considerable. The same applies to the automatic control expense.

The objective of the invention is to achieve an easily effected optimization of the displacement of the tension bow in a convertible vehicle.

The invention achieves this objective with a convertible vehicle with the features of claim 1 and with a movable vehicle roof with the features of claim 14. Advantageous refinements of the invention are described in dependent claims 2 to 13.

The invention limits the movement of the tension bow about the first center of motion, which is active during the upward movement of the tension bow from its closed position on the closed supporting structure to its return movement approximately back to this level with the supporting structure open. This prevents uncontrolled further downward rotation of the tension bow. Instead, during the downward movement below the level of the closed position, the movement about the first center of motion is checked, and this stops the continuation of this downward movement. Nevertheless, only one driving mechanism for the movement of the tension bow is sufficient.

In particular, the movement can be checked purely mechanically without any active elements that would require automatic control expense.

If, during its downward displacement below the original level, the tension bow rests on a stop, it can be transferred in the position in which it is thus supported into the folding-top compartment or similar lowered position without it having to slide over additional supports during this movement and thus promote wear.

If the upward movement and return movement of the tension bow for opening the supporting structure moves about an axis of rotation as the first center of motion, the stop can be arranged tangentially to the circumference of the circle of rotation, so that the tension bow makes contact with it perpendicularly, and during its further downward displacement, there is no further relative movement between the tension bow and the stop.

However, favorable spacing of the tension bow from the stop when the roof is closed ensures that the full distance to the support on the supporting structure on the bodywork continues to be available to the tension bow, and therefore, the tension of the closed roof of the invention can remain unaffected.

If the downward displacement is brought about by a four-bar linkage, it is possible, during this displacement, to achieve a translation between a pivoting angle, say, of a lateral frame part of the roof, which must carry out a large pivoting angle of well over 90°, and a small pivoting angle of the tension bow, which must be displaced only by less than 30°. In this way, the tension bow can set down on a support only at the very end of the lowering movement without there having to be any relative movement between these parts.

In this regard, if the support is arranged on a roof-mounted arm that extends towards the rear from the main bearing, compensation of tolerances from the roof manufacture is already possible before its installation in the bodyshell of the automobile body. In this way, the supports are more readily accessible than in the automobile body after the roof has been put on. In addition, the roof can then be delivered as a finished module for bodyshell installation with the supports already in a properly adjusted state. Alignment on any other body parts, say, in the bottom of the folding-top compartment, is completely unnecessary.

Further advantages and features of the invention are explained below with reference to the specific embodiment of the object of the invention that is schematically illustrated in the drawings.

The convertible vehicle 1 of the invention can be both a two-seater and a convertible vehicle with a larger interior and, e.g., two rows of seats one behind the other.

It has a movable roof 2, which has a flexible roof covering 3 at least in its rear area. In the illustrated embodiment, the roof covering 3 extends over the entire movable roof.

The roof covering 3 can include a rear window that is flexible and thus foldable itself. The rear window 4 can also be rigid and can be made, for example, of plastic or glass.

Figure 1:
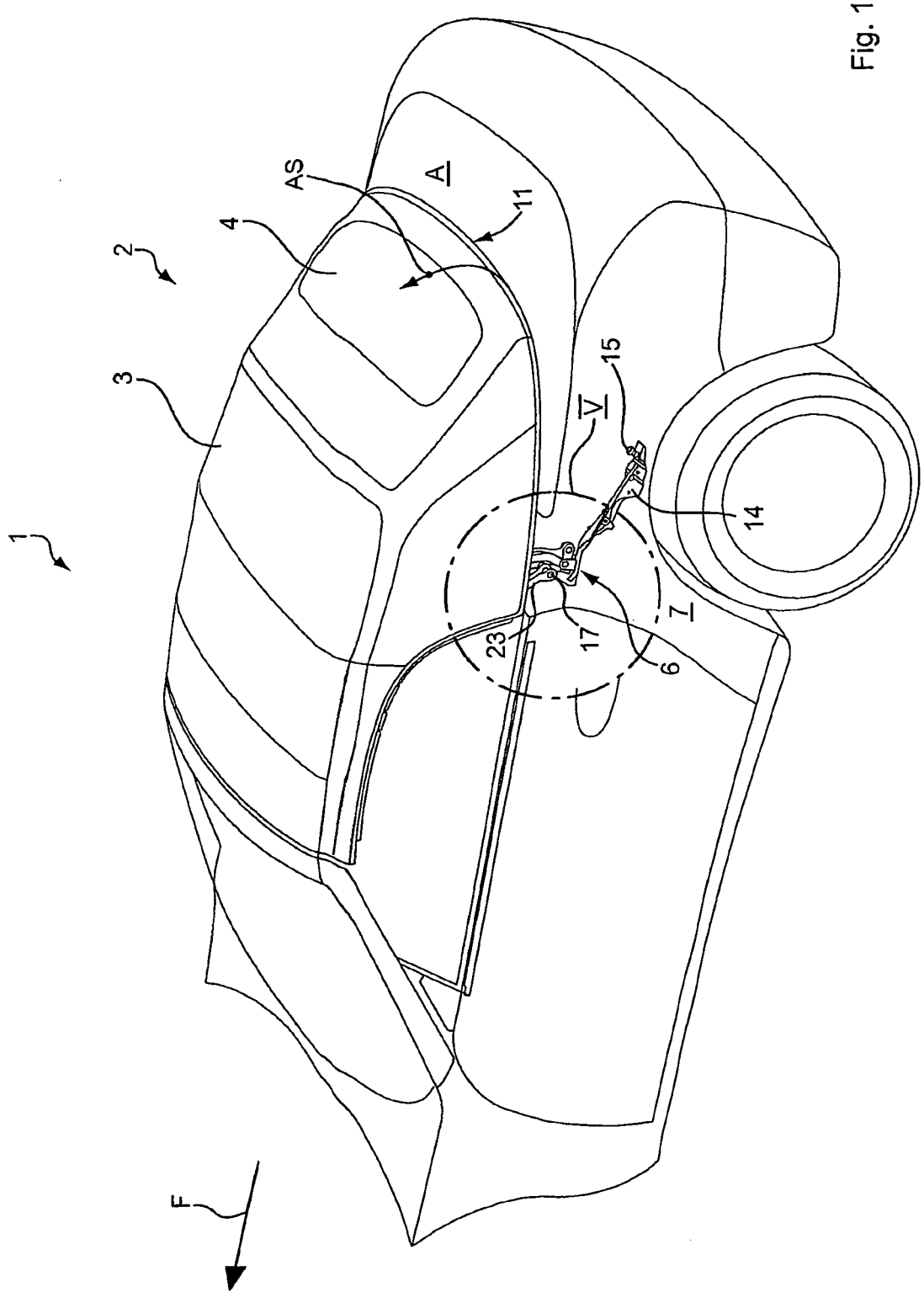
FIG. 1 shows a middle region of a convertible vehicle of the invention in a schematic, partially cutaway perspective view with the roof completely closed.

The roof covering 3 is held from below by a roof linkage, which is labeled as a whole by reference number 5. The roof linkage 5 is mounted on the bodyshell of the automobile body 7 by two lateral main bearings 6. In its closed state, the roof 2 then assumes the position shown in FIG. 1. The joint axes of the main bearings 6 lie horizontally and transversely to the vehicle 1, so that the roof 2 can be swung away to the rear or can be displaced downward to open it by superimposing translational and rotational movements in a wide variety of ways.

The roof linkage 5 comprises here several bows 8, 9 that support the roof covering 3 from below and run transversely to the roof 2, an inherently rigid roof tip 10 that runs parallel to the bows 8, 9, and a rear tension bow 11, which is essentially U-shaped when viewed from above and comprises a transversely extending center bar 12 and lateral legs 13 that run essentially lengthwise relative to the vehicle 1 in their mounted state. Instead of the one continuous rear tension bow 11, it is also possible to provide individual lateral tension bows, which, for example, can extend towards the rear as fins that taper to an acute angle.

Furthermore, arms 14, which are rigidly connected with the rigid parts of the roof linkage 5, can extend to the rear and downward from the main bearings 6 of the roof linkage 5 in the same vertical planes in which the lateral legs 13 of the tension bow 11 lie. These arms 14 will be described in greater detail below.

A main bearing 6 located on each longitudinal side of the vehicle is illustrated in detail in FIGS. 5 to 9. In particular, each main bearing 6 comprises a first body-mounted pivot joint 17, on which a lateral frame part 18 that acts as a main post of the roof 2 is indirectly articulated by a connecting piece 23 or is directly articulated, and a second pivot joint 19 arranged further forward in the direction of vehicle travel F, on which a short coupling link 20 is articulated. Both joints 17, 19 have horizontal pivot axes transverse to the vehicle 1.

At its opposite end 21 from the joint 19, the coupling link 20 articulates the body-mounted joint 19 with a control link 22, which is L-shaped in a side view and is articulated at its other end in a fork-shaped mounting 24 that is secured to the connecting piece 23 of the main post 18 to the joint 17.

The body-mounted joints 17, 19 and the other joints 21, 24 thus form a four-bar linkage.

Figure 2:
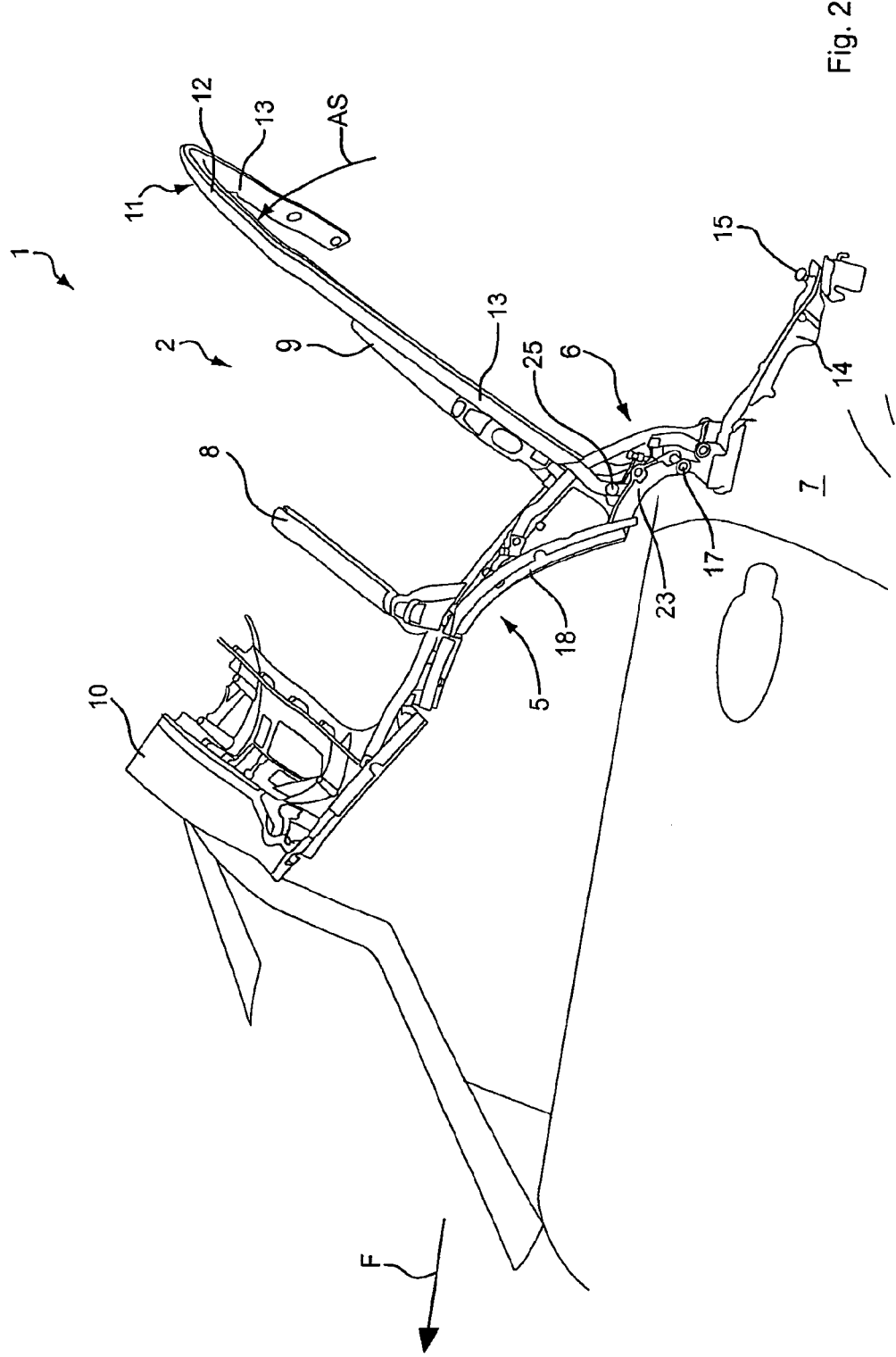
FIG. 2 shows a view similar to that of FIG. 1 as the roof is starting to open with the tension bow moved upward to open an opening path for the supporting structure, wherein the roof is shown without the roof covering for the sake of clarity.
Figure 3:
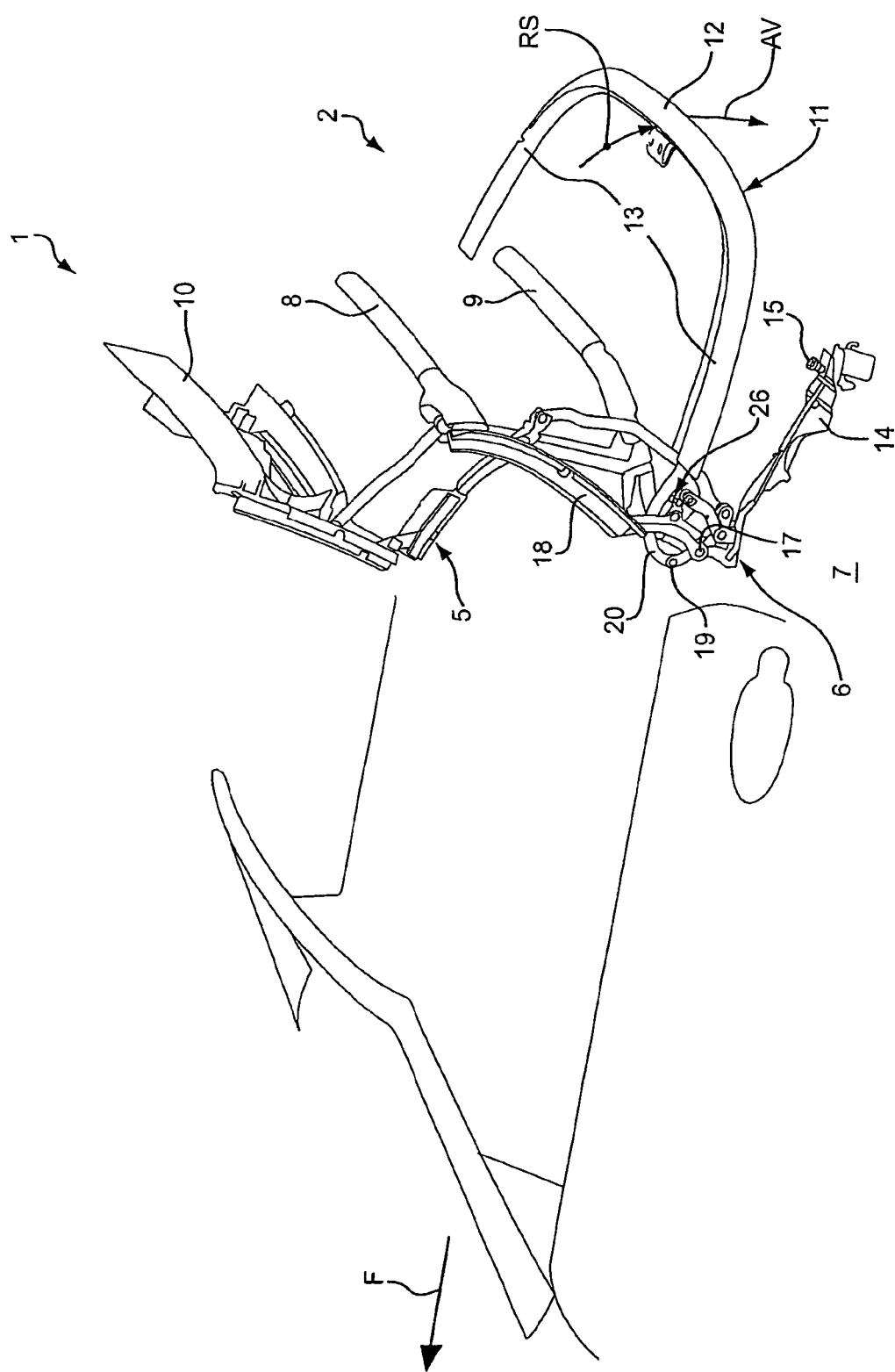
FIG. 3 shows a view similar to that of FIG. 2 with further progression of the opening of the roof and with the tension bow swiveled back again and now located just below its plane of extension with the roof closed.
Figure 6:
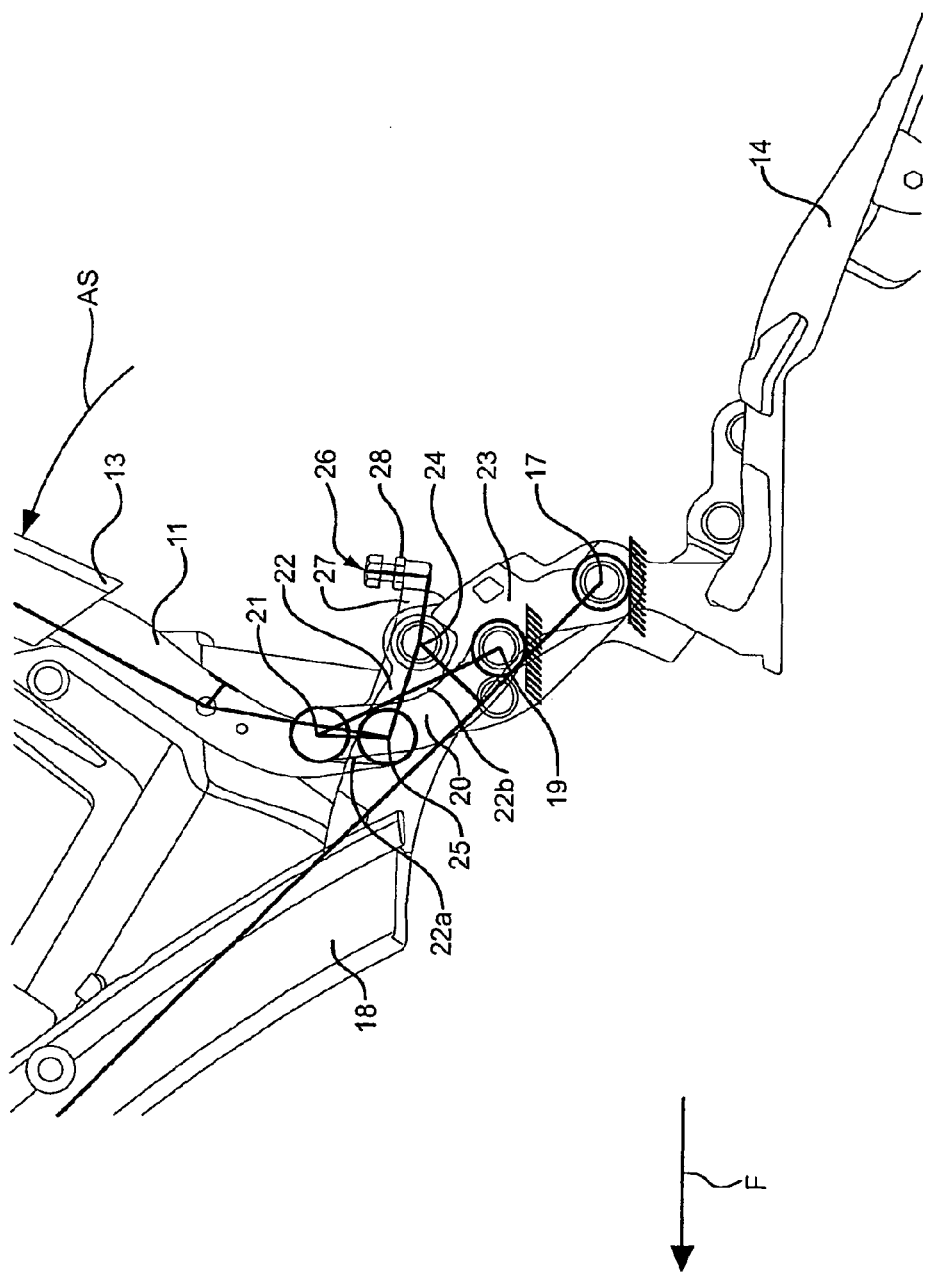
FIG. 6 shows a view similar to that of FIG. 5 in the moving position shown in FIG. 2 with the tension bow moved upward.
Figure 7:
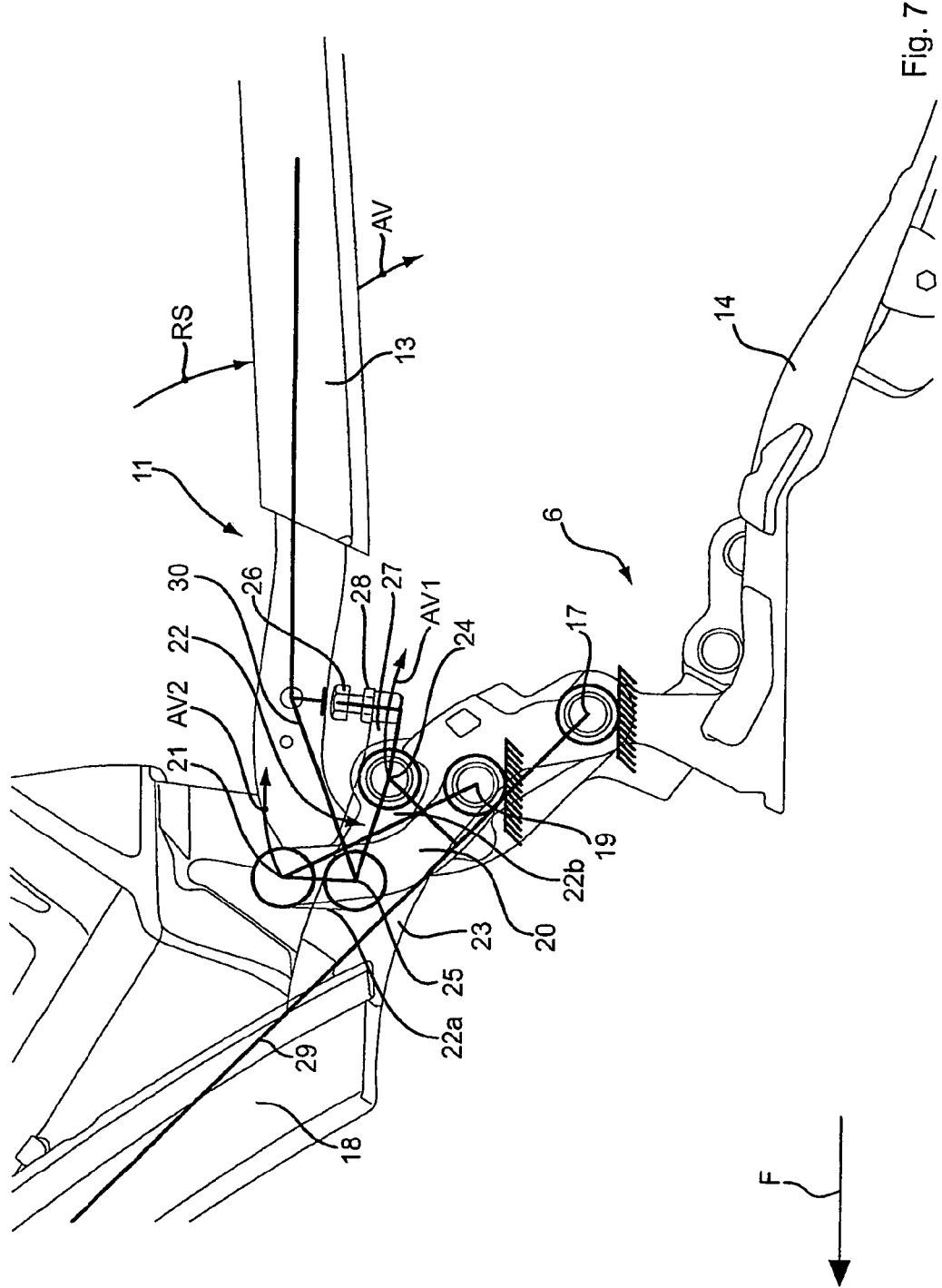
FIG. 7 shows a view similar to FIG. 6 after completion of the return movement of the tension bow and at the beginning of contact with the lateral stops in the transition to the downward displacement.

The L-shaped control link 22 supports, e.g., in the bend between the short leg 22a that projects upward when the roof is closed and the leg 22b that extends toward the rear, a pivot joint 25, whose axis serves as the first center of motion for the upward rotation AS and return rotation RS of the tension bow 11, which points essentially rearward from it, from its position on the supporting structure A of the automobile body 7 (FIG. 1, FIG. 5) into its upright position (FIG. 2, FIG. 6) and back into the original level with the supporting structure A open (FIG. 3, FIG. 7).

In addition, the long leg 22b of the control link 22 extends a few centimeters to the rear beyond the joint 24, and this arm 27 of the long leg 22b carries at least one stop 26 as a passive mechanical element for stopping the movement. The height of this arm 27 can be adjusted, for example, by a knurled nut 28. In addition, it is also possible to make it adjustable in its inclination and in its longitudinal and/or transverse direction.

Figure 5:
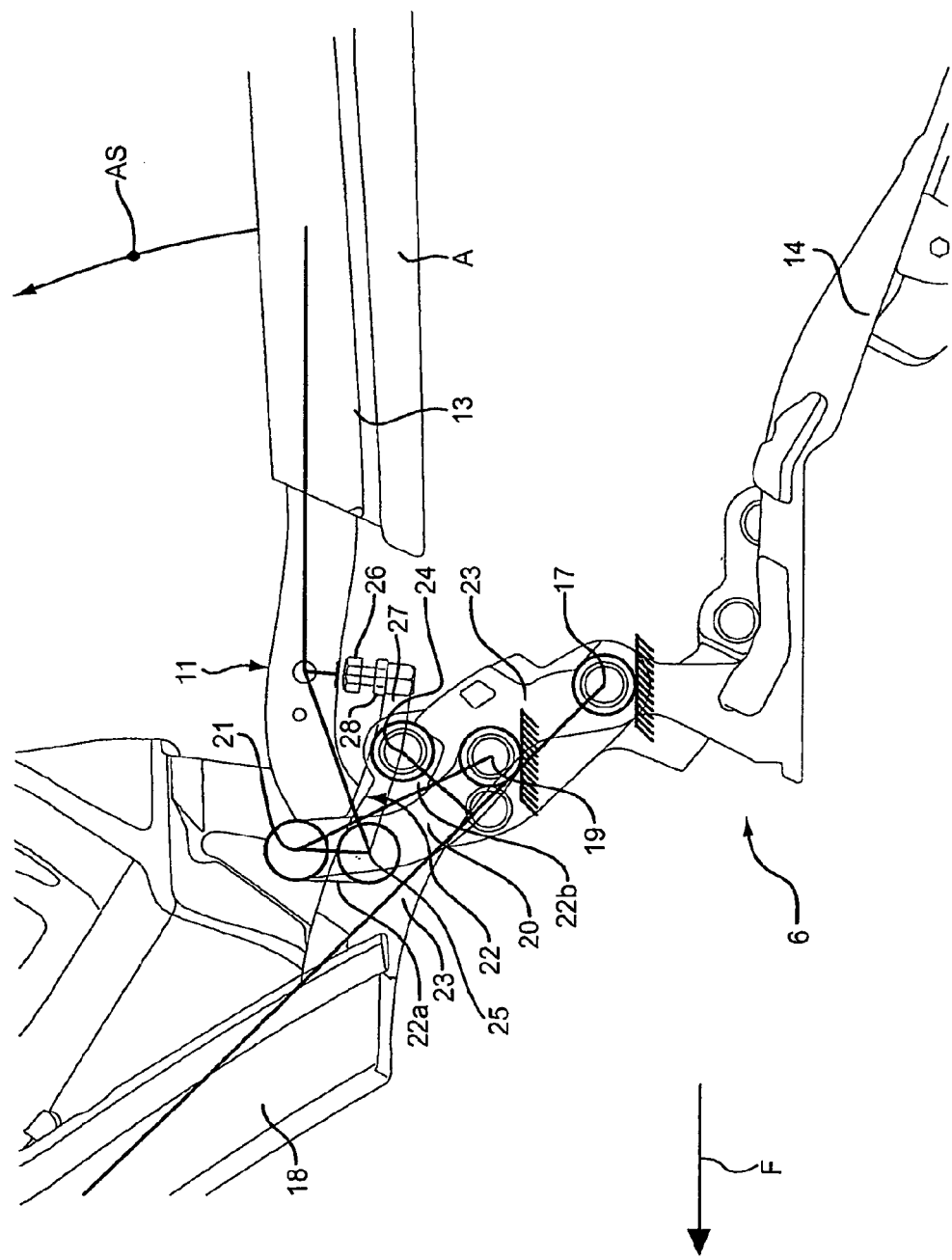
FIG. 5 shows a side detail view of the near region of the main bearing, corresponding approximately to sector V in FIG. 1, again without the roof covering, in the initial position of the tension bow with the roof closed.

When the roof 2 is closed, the tension bow 11 rests tightly on the supporting structure A of the automobile body 7 under the compression of a seal (not shown). To be able to produce sufficient compression here, the height of the stop 26 is adjusted in such a way that the tension bow 11 in this position is spaced some distance from the stops 26 (FIG. 5). Accordingly, this position is not affected by the invention. Contact with the stop 26, which could reduce the amount of pressure applied, is avoided when the roof 2 is closed.

Figure 4:
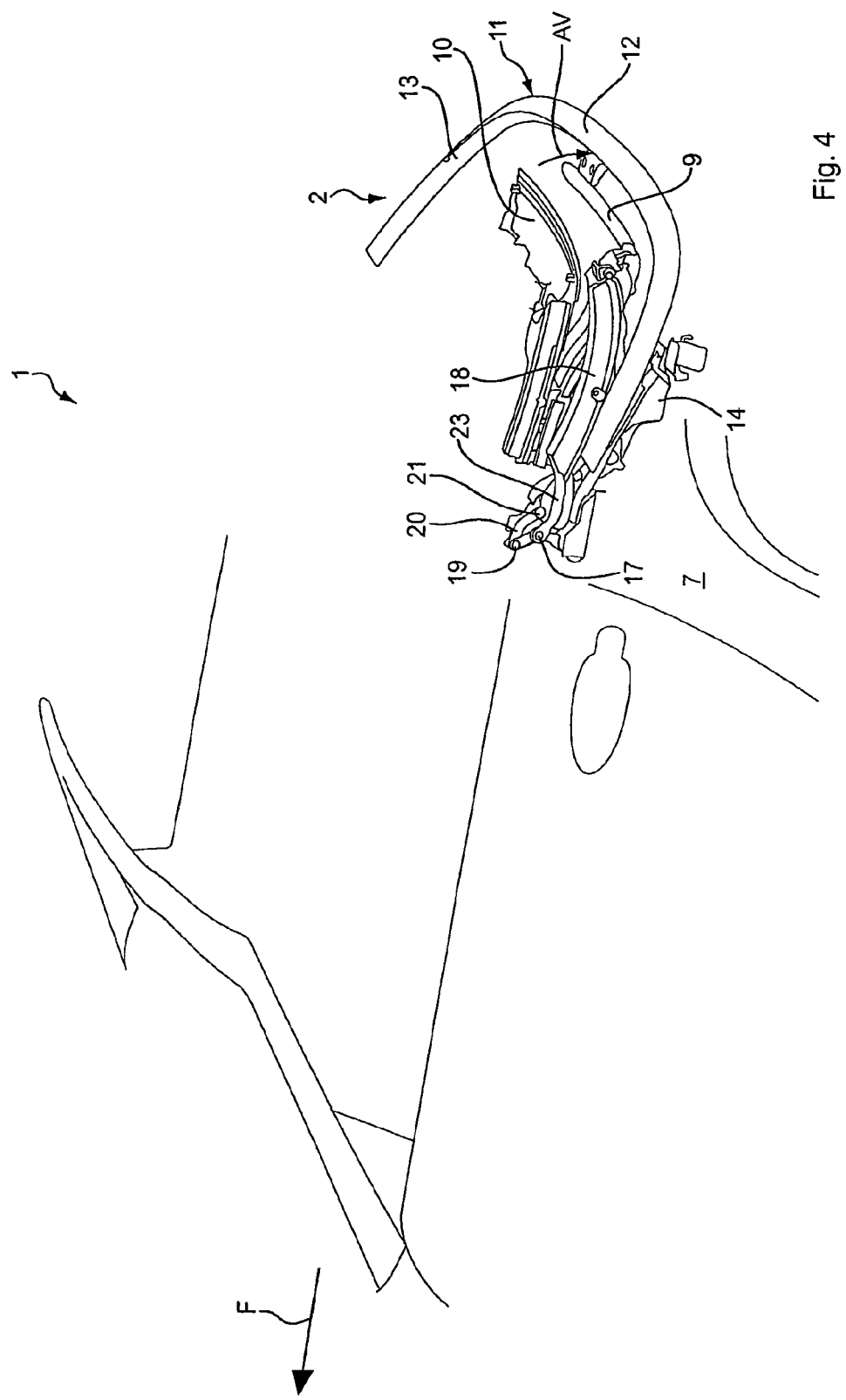
FIG. 4 shows a view similar to that of FIG. 3 with the roof in its completely open position and the tension bow resting on lateral supports in its lowered position.

Besides the aforesaid arm 27, another, considerably longer arm 14 that is directed toward the rear can be optionally provided, as was indicated earlier. At its free end away from the direction of vehicle travel F, this arm 14 is provided with a support 15, on which the tension bow 11 rests when the roof 2 is open (FIG. 4). Since the arms 14 are part of the roof linkage 5, this support can be adjusted independently of the automobile body 7, e.g., before installation of the roof 2 on the body.

The supports 15 can be elastically deformed on the upper side in the manner of a cushion. The supports 15 can be elastically supported relative to the arms 14 and can be adjusted at least in height. A longitudinal or transverse adjustment of the supports 15 is also possible, as is an adjustment of their inclination.

Before it is installed in the bodyshell, the roof 2 can thus be preassembled on its main bearings 6, e.g., on a stand, so that it can be opened there, and in the process the tension bow 11 drops down. During this process, the supports 15 can be adjusted.

The modular unit, which has been finally adjusted in this way, can then be delivered to the bodyshell and merely joined with the bodyshell by the opposite main bearings 6 without any necessity of additional work for proper alignment of the roof.

In the installed state, the roof covering 3 of the closed roof 2 is stretched over the roof tip 10, the bows 8, 9, and the rear tension bow 11.

To open the roof, the tension bow 11 is raised from its support position on a supporting structure A of the automobile body 7, e.g., the cover of a folding-top compartment, in an upward rotational movement about the axis 25, which constitutes the first center of motion, in the direction of arrow AS (FIG. 2, FIG. 6).

This makes room for the opening of the supporting structure A, so that in a subsequent return rotational movement in the direction of arrow RS, the tension bow 11 can move back approximately to its original level with the roof 2 closed but now no longer supported by the still open supporting structure A (FIG. 3, FIG. 7). Instead, at the end of its return movement RS, the tension bow 11 reaches the stop 26 that lies tangentially to the circle of rotation about the axis 25 (FIG. 7). The stop 26 stops and prevents further downward rotation of the tension bow 11 in the direction of arrow RS. Its movement about the first center of motion 25, which is not necessarily a single pivot axis, is thus ended for the progress of the roof opening. The tension bow 11 and the stop 26 do not change their position relative to each other during the remainder of the opening operation, so that no wear-producing relative motion can occur between these parts. During the described motion AS, RS about the axis 25, the four-bar linkage 17, 19, 21, 24 that produces motion about a second center of motion remains completely stationary.

Figure 8:
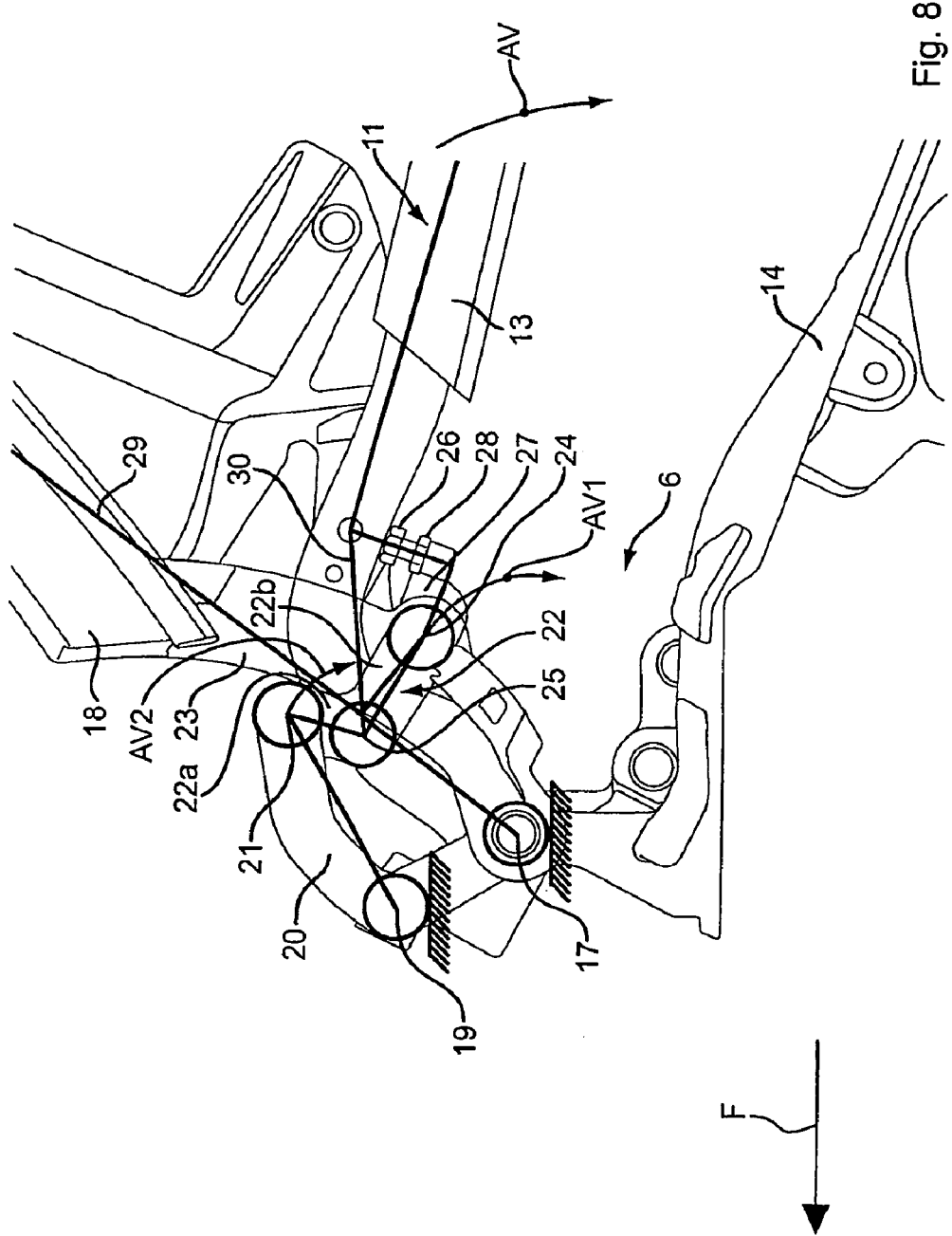
FIG. 8 shows a view similar to that of FIG. 7 during further progress of the downward displacement.
Figure 9:
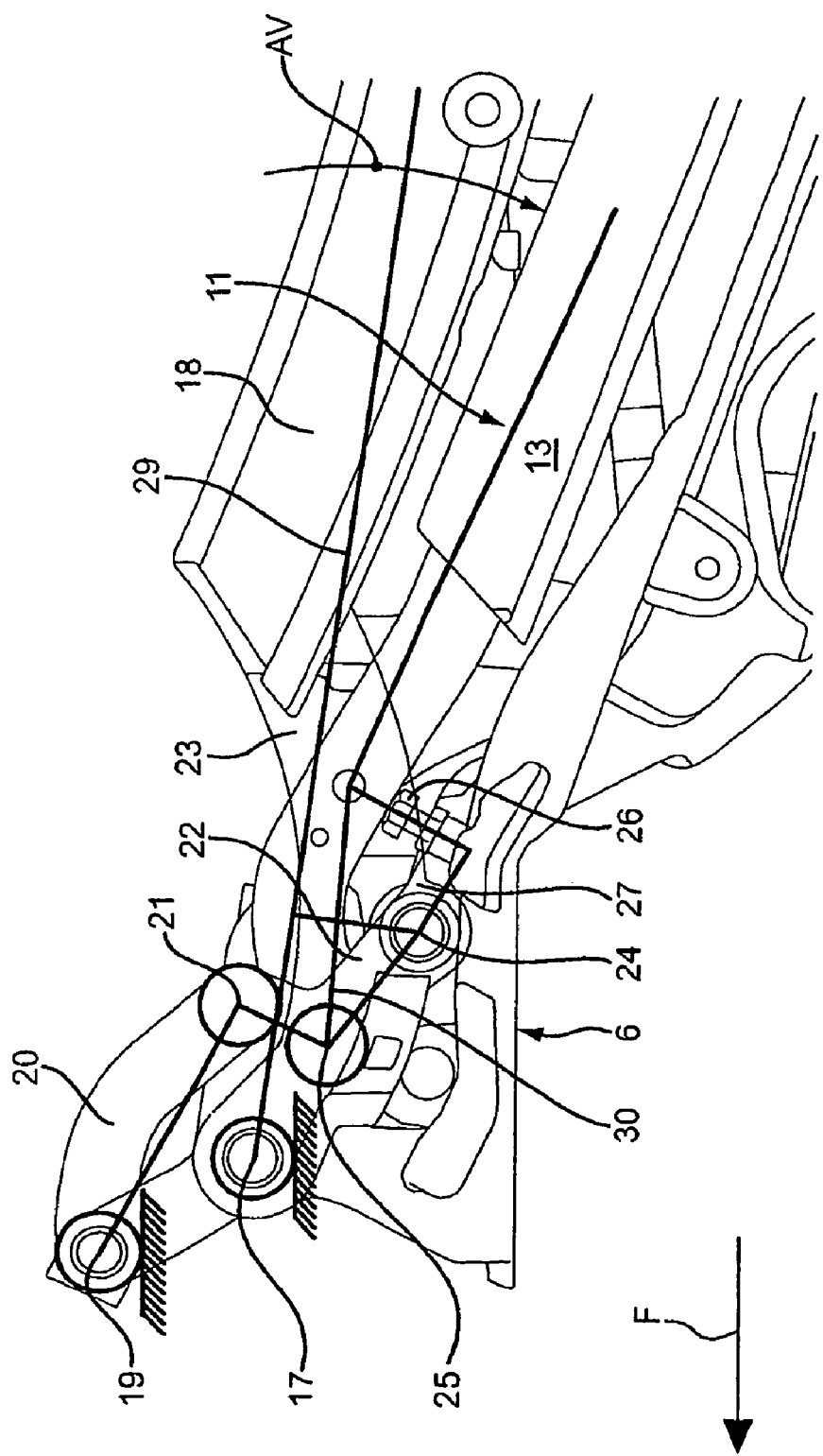
FIG. 9 shows a view similar to that of FIG. 8 with the roof completely lowered into the open position.

The further downward displacement AV below the original level of the tension bow 11 with the roof 2 closed immediately follows the return rotation RS: To this end, the main post 18 and the coupling link 20 are rotated rearward and downward about the two body-mounted joints 17, 19 and during this movement, simultaneously move the joint 21 of the coupling link 20 and the joint 24 of the connecting piece 23 on circular paths AV1 and AV2 about the joints 17, 19 (FIG. 7 to FIG. 9). During this downward displacement AV, the tension bow 11 held in the joint 25 on the L-shaped control link 22 hanging between the joints 21 and 24 is simultaneously moved rearward and downward in a combined movement that deviates from a circular path, but it is only rotated in a very small angle due to the four-bar linkage control 17, 19, 21, 24.

This is made clear, for example, by considering the straight line 29 that runs from the joint 17 in the direction of the main post 18. This straight line 29 is rotated by, for example, by about 140° between FIG. 7 and FIG. 9, whereas the straight line 30 that runs from the joint 25 in the direction of the lateral legs 13 of the tension bow 11 is rotated by only about 20°. As a result, the tension bow 11 lands from above on the supports 15 only in the end phase of the downward movement (FIG. 4), and even there no wear-promoting relative motion between the parts 11 and 15 can occur.

Therefore, the four-bar linkage 17, 19, 21, 24 effects a translation between the rotational movements of the different parts 18, 11 and prevents the control link with the tension bow 11 rigidly resting on it via the stop 26 in the downward displacement AV from falling down in an uncontrolled way. In addition, the downward displacement AV of the tension bow 11 is not a pure rotation but rather includes a rearward component, whereas the movement of the main post 18 is a pure rotational motion AV1 about the joint 17.

Instead of the four-bar linkage 17, 19, 21, 24, other multi-joint linkages are also possible, possibly with connecting link guides.

The invention can be used both in vehicles with manually moved roofs and in vehicles with fully automatically or semi-automatically moved roofs.

The invention claimed is:

1. Convertible vehicle (1) with a roof (2) that has a flexible roof covering (3) at least in the rear area, wherein, in the closed state, the roof covering (3) can be held under tension relative to the automobile body (7) by at least one tension bow (11), and wherein, to open the roof (2), the tension bow (11) can first be displaced upward (AS) from a closed position in which the tension bow lies on a closed supporting structure (A) of the automobile body (7), then rotated back (RS) with the supporting structure open, and then displaced downward (AV) into an open position located below the level of the closed supporting structure (A), wherein for the upward movement (AS) and return movement (RS) of the tension bow (11), a first center of motion (25) is provided, and for the downward displacement (AV) of the tension bow, a second center of motion that is separate from the first center of motion is provided, and during the downward displacement (AV) of the tension bow (11) about the second center of motion, the motion of the tension bow about the first center of motion (25) is stopped, wherein during the downward displacement (AV) of the tension bow about the second center of motion, the tension bow (11) rests on a stop (26) and does not move relative to the stop (26) during the entire downward displacement (AV).

2. Convertible vehicle (1) in accordance with claim 1, wherein the motion of the tension bow is stopped by purely mechanical means.

3. Convertible vehicle (1) in accordance with claim 1, wherein during the upward movement (AS) and the return movement (RS) of the tension bow (11), movement about the second center of motion is stopped.

4. Convertible vehicle (1) in accordance with claim 1, wherein the first center of motion (25) is a pivot axis.

5. Convertible vehicle (1) in accordance with claim 1, wherein in the open position of the roof (2), the tension bow (11) rests on at least one support (15), which are held on lateral arms (14), which are connected with a roof frame (5) that holds the roof covering (3) from below before the roof frame (5) is installed on the automobile body (7).

6. Convertible vehicle (1) in accordance with claim 1, wherein the downward displacement (AV) about the second center of motion is produced by a four-bar linkage (17; 19; 21; 24).

7. Convertible vehicle (1) in accordance with claim 6, wherein the four-bar linkage (17; 19; 21; 24) comprises two body-mounted joints (17; 19), one of which rotatably supports a lateral post section (18) that extends forward and upward in the direction of vehicle travel (F) when the roof (2) is closed, while the other rotatably supports a short coupling link (20).

8. Convertible vehicle (1) in accordance with claim 7, wherein the coupling link (20) and the roof post (18) are connected with each other by a control link (22) located between and connected to the coupling and the roof part by joints (21; 24).

9. Convertible vehicle (1) in accordance with claim 8, wherein the center of motion (25) for the upward movement (AS) and the return movement (RS) of the tension bow (11) is supported on the control link (22).

10. Convertible vehicle (1) in accordance with claim 8, wherein an arm (27) that points to the rear is assigned to the control link (22) and carries a stop (26) for limiting the movement of the tension bow (11) about the first center of motion (25).

11. Convertible vehicle (1) in accordance with claim 10, wherein when the roof (2) is closed, the tension bow (11) is spaced some distance from the stop (26).

12. Convertible vehicle (1) in accordance with claim 10, wherein at least the height of the stop (26) can be adjusted.

13. Movable vehicle roof (2) for a convertible vehicle (1) having a flexible roof covering (3) at least in the rear area, wherein, in the closed state, the roof covering (3) can be held under tension relative to the automobile body (7) by at least one tension bow (11), and wherein, to open the roof (2), the tension bow (11) can first be displaced upward (AS) from a closed position in which the tension bow lies on a closed supporting structure (A) of the automobile body (7), then rotated back (RS) with the supporting structure open, and then displaced downward (AV) into an open position located below the level of the closed supporting structure (A), wherein for the upward movement (AS) and return movement (RS) of the tension bow (11), a first center of motion (25) is provided, and for the downward displacement (AV) of the tension bow, a second center of motion that is separate from the first center of motion is provided, and during the downward displacement (AV) of the tension bow (11) about the second center of motion, the motion of the tension bow about the first center of motion (25) is stopped, wherein during the downward displacement (AV) of the tension bow about the second center of motion, the tension bow (11) rests on a stop (26) and does not move relative to the stop (26) during the entire downward displacement (AV).

* * * * *